Patented Oct. 29, 1935

2,018,715

UNITED STATES PATENT OFFICE 2,018,715

TREATING HYDROCARBON OILS WITH FORMALDEHYDE, A CONDENSING AGENT, AND ACETIC ACID

Stewart C. Fulton, Elizabeth, N. J., assignor to Standard Oil Development Company, a corporation of Delaware No Drawing. Application December 29, 1934, Serial No. 759,798

6 Claims. (Cl. 196—23)

This invention relates to the improvement of low grade lubricating oils by selectively condensing the undesirable constituents to higher molecular compounds with formaldehyde followed by their removal either by recovering the oil as overhead in a distillation or by solvent extraction. It also relates to the conversion of lower viscosity oils to improved higher viscosity oils.

The formation of insoluble formolites (highly insoluble condensation products of certain petroleum constituents with formaldehyde) is well known in petroleum chemistry, where concentrated sulfuric acid in the cold is used as the condensing catalyst. The reaction, however, when strong sulfuric acid is used, is not very selective when applied to improving lubricating oils, since a large quantity of the desirable constituents are converted to insoluble condensation products. It is apparent that aromatics and naphthenes with long paraffinic side chains of high lubricating value are completely removed by this reaction as a heavy insoluble product.

I have discovered that it is possible to modify the condensing catalyst in such a way so as to permit more selective condensation even at the boiling point of the reacting mixture. For example, if 9 parts of glacial acetic acid are mixed with 1 part of 66° Baumé sulfuric acid and 1 part of formaldehyde (37% aqueous solution) a condensing mixture is produced which when contacted with a lubricating oil requires about three hours for the condensation of the formaldehyde with the most reactive and undesirable constituents of the oil. Considerably less insoluble condensation products are formed in contrast to the known reaction with strong sulfuric acid. In fact the formation of oil insoluble constituents can be practically eliminated by increasing the proportion of aqueous formaldehyde to the acid mixture or by increasing the amount of acetic acid. High molecular weight, high boiling oil soluble compounds are formed in place of the customary extremely insoluble formolites produced when sulfuric acid in high concentration is used as the condensing catalyst.

The presence of these soluble high molecular weight compounds in the oil increases the viscosity to a large extent as well as considerably improves the viscosity temperature relationship. This relationship may be quantitatively expressed by means of the so-called Viscosity Index as determined by the method described in the October 1929 number of the Chemical and Metallurgical Engineering in an article entitled "Viscosity variations of oils with temperature" by E. W. Dean and G. H. B. Davis. If lower viscosity, higher Viscosity Index oils are desired, the condensed compounds may be removed by distillation (where they remain as bottoms) or readily separated by solvent extraction by virtue of the large differences in molecular weight. Propane and other condensable hydrocarbons which are gaseous at atmospheric temperature and pressure may be used for this purpose.

The acid condensing mixture may be repeatedly used after suitable concentration to take care of the water formed in the reaction.

Other condensing catalysts may be used as, for example, the sulfuric acid in the acid mixture may be replaced by ferric chloride (in concentrated aqueous solution). In general this condensing catalyst requires somewhat longer times for complete reaction of the formaldehyde. It is also possible to increase the ratio of sulfuric acid to acetic whereby a more active condensing reagent is obtained, however, both at the expense of selectivity and in the production of more insoluble condensation products.

In my process the formaldehyde acts as a condensing agent, the sulfuric acid as a catalyst for the condensation reaction, while the acetic acid probably acts as an oil solvent. My process is distinguished from the known formolite reaction, which is carried out with a mixture of formaldehyde and strong sulfuric acid, both by the use of acetic acid and also by the presence of the sulfuric acid in a more dilute condition than it is used in the formolite reaction. In my process the upper limit of the concentration of the sulfuric acid is approximately that corresponding to the one in the following mixture: 1 part by weight of 66° Baumé sulfuric acid, 1 part by weight of glacial acetic acid, and 1 part by weight of formaldehyde (37% solution). The best results are obtained with lesser concentrations of the condensation catalyst (sulfuric acid) obtainable by (1) using more acetic acid; (2) using more formaldehyde; and (3) using weaker sulfuric acid. The amount of the glacial acetic acid as compared to the amount of 66° Baumé sulfuric acid should not be decreased below the given proportion of 1:1. With more acetic acid better results are obtained and the selectivity is increased. In any case the dilution of the condensation catalyst increases the selectivity of the condensation reaction so that only such constituents are condensed as are undesirable in the lubricating oil. Furthermore, the condensation products obtained by the use of more dilute condensation catalysts are oil soluble and are not precipitated out in large quantities from the body of the oil, as happens in the formolite reaction.

The following examples will further illustrate how my invention may be carried out in practice, but the invention is not limited to these examples.

A West Texas lubricating stock was treated for three hours at 100–105° C. under a reflux condenser with 5% (37% aqueous formaldehyde) containing in addition 1 part of 66° Baumé sulfuric acid and 9 parts of glacial acetic acid based on the formaldehyde. After separation of the acid layer, filtering off a small amount of insoluble material (which collects at the interface of the acid and oil layers) and water washing, a more viscous, higher Viscosity Index oil was obtained. The inspection data before and after treating were as follows:

|  | Untreated oil | Treated oil |
|---|---|---|
| Gravity, °A. P. I. | 20 | 20.6 |
| Viscosity Saybolt at 100° F | 920 | 1689 |
| Viscosity Saybolt at 210° F | 69.4 | 95 |
| Pour, °F | −10 | −5 |
| Viscosity Index | 39 | 54 |

As another example, a West Texas lubricating stock was treated with 10% formaldehyde and corresponding proportional parts of acetic and sulfuric acids as used in the first example. After three hours of refluxing at 100–105° C. the treated oil was distilled under vacuum to remove as residue the soluble condensation products. The inspection data of the original oil, undistilled and distilled, and the treated oil, undistilled and distilled, were as follows:

|  | Original oil | Original oil distilled | Treated oil | Treated oil distilled |
|---|---|---|---|---|
| Yield percent | | 96.9 | 95 | 78 |
| Gravity, °A. P. I. | 20.3 | 20.6 | 18.8 | 26.5 |
| Viscosity Saybolt at 100° F | 920 | 798 | 6241 | 544 |
| Viscosity Saybolt at 210° F | 69.4 | 66 | 190 | 60 |
| Pour, °F | −10 | 0 | +10 | +5 |
| Color (Robinson) | | 1¾ | | 2½ |
| Conradson Carbon, percent | .873 | .521 | 9.380 | .371 |
| Viscosity Index | 39 | 45 | | 66 |

My process may be modified in various ways. Thus, for example, the reaction may be carried out under pressure and at higher temperatures than the ones mentioned above. In such a case the time of reaction is simultaneously reduced. Instead of glacial acetic acid, ordinary acetic acid may be used. In this case, however, care should be taken to use a concentrated sulfuric acid or a more concentrated formaldehyde solution so as to adjust the final concentration of water and acetic acid in the mixture to the right proportions. Other oils such as gas oils, furnace oils, kerosene and even naphthas, may also be treated by my process. Furthermore, other oils such as shale oils, low temperature carbonization tars, oils produced by hydrogenation, etc., may be subjected to such treatment. Light oils treated by this method, for example kerosene, will have much better burning qualities. The smoke forming aromatics will be removed.

My invention is not to be limited by the examples given for illustration but only by the following claims in which it is my intention to claim all novelty inherent in the invention.

What I claim is:

1. The process of treating hydrocarbon oil which comprises bringing about condensation of certain constituents of the oil with a mixture of sulfuric acid and glacial acetic acid and formaldehyde in such proportions that the concentration of the sulfuric acid in the mixture is not higher than the one corresponding to the following mixture: 1 part by weight of 66° Baumé sulfuric acid, 1 part by weight of glacial acetic acid and 1 part by weight of formaldehyde.

2. The process according to claim 1 in which a larger proportion of glacial acetic acid is used in the mixture.

3. The process of treating a lubricating oil stock which comprises heating the stock with a condensation reaction mixture containing formaldehyde, sulfuric acid and glacial acetic acid in such proportions that the concentration of the sulfuric acid is not higher than the one in the following approximate mixture: 1 part by weight of 66° Baumé sulfuric acid, 1 part by weight of glacial acetic acid and 1 part by weight of formaldehyde.

4. The process according to claim 3 in which a larger proportion of glacial acetic acid is used.

5. The process according to claim 3 in which the treatment is carried out by heating the lubricating oil stock with the condensation reaction mixture, separating the acid layer from the lubricating oil layer and distilling the lubricating oil layer to remove heavy condensation products as residue.

6. The process according to claim 3 in which the sulfuric acid is replaced by a concentrated solution of ferric chloride.

STEWART C. FULTON.